M. S. BASSISTY.
POCKET IMPLEMENT.
APPLICATION FILED AUG. 29, 1917.
1,275,364.
Patented Aug. 13, 1918.
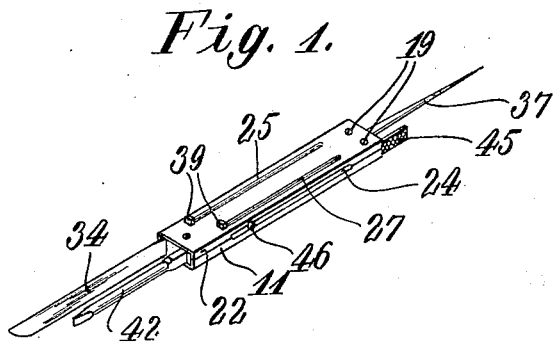
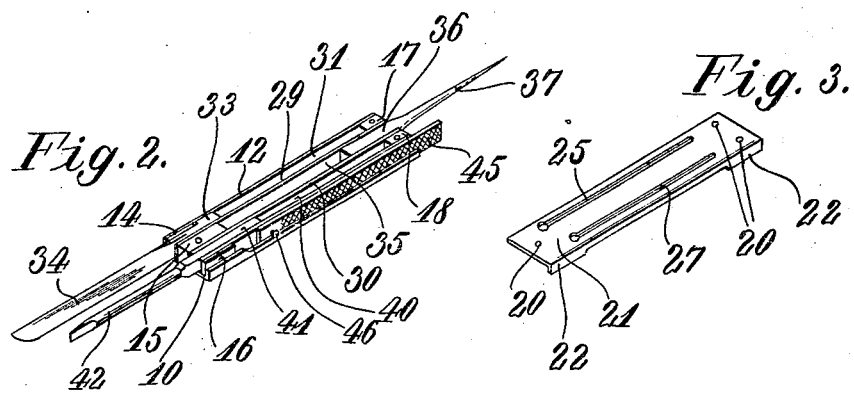
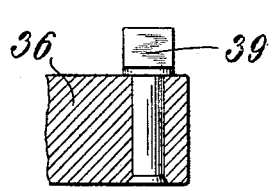
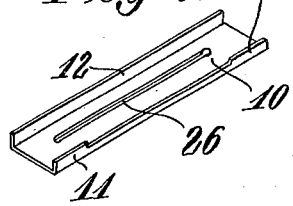
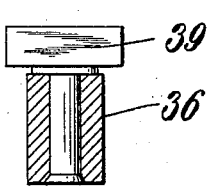
WITNESS:
Richard A. Wegener.
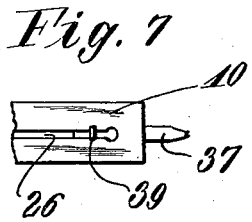
INVENTOR.
Michael S. Bassisty.
BY
Oscar Giler
HIS ATTORNEY.

UNITED STATES PATENT OFFICE.

MICHAEL S. BASSISTY, OF PHILADELPHIA, PENNSYLVANIA.

POCKET IMPLEMENT.

1,275,364.  Specification of Letters Patent.  Patented Aug. 13, 1918.

Application filed August 29, 1917. Serial No. 188,721.

*To all whom it may concern:*

Be it known that I, MICHAEL S. BASSISTY, a citizen of Russia, resident of Philadelphia, county of Philadelphia, and State of Pennsylvania, have invented certain new and useful Improvements in Pocket Implements, of which the following is a specification.

This invention relates to improvements in pocket implements, and has as its special object the provision of an article which may be carried in the pocket of a garment, and contains a plurality of small useful implements in such manner as to protect the same when not extended for use.

These and other like objects are attained by the novel construction and combination of parts hereafter described and shown in the accompanying drawing, forming a material part of this disclosure, and in which—

Figure 1 is a perspective view showing an implement made in accordance with the invention.

Fig. 2 is a similar perspective view of the same, the cover plate being removed, with the controlling knobs for the implements removed.

Fig. 3 is a perspective view of the cover plate.

Fig. 4 is an enlarged fragmental sectional view of the shank of one of the several implements with its operating knob.

Fig. 5 is a similar sectional view taken in another plane.

Fig. 6 is a perspective view of the casing, and,

Fig. 7 is a fragmental bottom plan view of the same engaged with one of the implements.

The invention comprises a rectangular casing 10, having two upstanding lateral walls 11 and 12, and containing blocks 14, 15 and 16 at one end, similar blocks 17 and 18 being at the other, certain of the blocks having openings formed through them receiving screws 19 passing through openings 20 formed in the cover plate 21, by means of which it may be rigidly secured. The cover has downwardly extending portions 22, at one end the remaining edge being formed in connection with the corresponding edge of the main casing as to present an open slot 24 on one side, slots 25 and 27 being formed through the cover, and a slot 26 through the main casing while divisional plates 29 and 30 are secured in the main casing 10 as indicated best in Fig. 2.

In the outer space 31, is slidably engaged the shank 33 of a knife blade 34, the same being operated by means of the knob 39, extending through the slot 25.

Similarly in the space 35, is a shank 36 formed with an awl or stylus 37, which, when in a retracted position, abuts against the fixed block 15 and is provided with another knob 39 extending through the slot 26 in the casing by means of which it may be operated.

In the space 40 is the shank 41, of a screw driver 42, its knob extending through the slot 27 in the cover, while contained in the longitudinal space immediately in back of the block 16 is a file 45, provided with an extending operating knob 46, the same being movable through the slot 24, and it is to be understood that each of the several implements may be individually withdrawn from the casing or retracted at any time when not required for use.

From the foregoing, it will be seen that a very neat and compact implement has been disclosed forming a convenient adjunct to the implements commonly carried in the pocket, and by means of which several operations may be performed.

Having thus described my invention, what I claim as new, and desire to secure by Letters Patent, is—

In a device as described, in combination, a pair of channel-shaped members adapted together to form a rectangular casing, one side wall of each of said members being cut away longitudinally to provide an elongated recess, a series of divisional plates arranged in said rectangular casing, the edges of said side walls of the two members being secured together, so as to provide a lateral longitudinal slot, blocks arranged between said side walls and said plates and between the plates themselves, one of said plates being positioned close to one side wall, a narrow block arranged at one end of the passage between said last-named plate and the adjacent side wall, an elongated file arranged to slide in said last-named passage and carrying an operating pin projecting through the side slot, a similar narrow block secured to the other side wall and spaced away from the adjacent plate, an implement projecting into the passage containing the last-named block and being cut-away to provide a recess into which the last-named block projects, and means whereby said last-named implement may be actuated.

In testimony whereof I have affixed my signature.

MICHAEL S. BASSISTY.

Copies of this patent may be obtained for five cents each, by addressing the "Commissioner of Patents, Washington, D. C."